US012798395B2

(12) United States Patent
Sengebusch

(10) Patent No.: US 12,798,395 B2
(45) Date of Patent: Nov. 17, 2026

(54) METHOD FOR TRANSPORTING A SECOND VEHICLE BY MEANS OF A FIRST VEHICLE

(71) Applicant: Robert Bosch GmbH, Stuttgart (DE)

(72) Inventor: Falco Sengebusch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/138,234

(22) PCT Filed: Nov. 29, 2023

(86) PCT No.: PCT/EP2023/083557
§ 371 (c)(1),
(2) Date: Jul. 17, 2025

(87) PCT Pub. No.: WO2024/126050
PCT Pub. Date: Jun. 20, 2024

(65) Prior Publication Data

US 2026/0200339 A1 Jul. 16, 2026

(30) Foreign Application Priority Data

Dec. 14, 2022 (DE) ..................... 10 2022 213 661.6

(51) Int. Cl.
*B60L 15/20* (2006.01)
*B60L 15/00* (2006.01)
(Continued)

(52) U.S. Cl.
CPC ......... *B60L 15/2009* (2013.01); *B60L 15/007* (2013.01); *B60L 53/53* (2019.02);
(Continued)

(58) Field of Classification Search
CPC ...... B60L 15/2009; B60L 53/53; B60L 53/62; B60L 53/66; B60L 15/007; B60L 2210/10
See application file for complete search history.

(56) References Cited

U.S. PATENT DOCUMENTS

2012/0304622 A1* 12/2012 Verbrugge ...... B60W 30/18127 60/274
2016/0153350 A1* 6/2016 Pappenheimer ........ F02B 37/14 60/608
(Continued)

FOREIGN PATENT DOCUMENTS

DE 10157976 A1 6/2002
DE 102013208852 A1 11/2013
(Continued)

OTHER PUBLICATIONS

Translation of International Search Report for Application No. PCT/EP2023/083557 dated Mar. 15, 2024 (2 pages).

*Primary Examiner* — Naeem Taslim Alam
(74) *Attorney, Agent, or Firm* — Michael Best & Friedrich LLP

(57) ABSTRACT

The invention relates to a method for transporting a second vehicle (20) by means of a first vehicle (10) which has a first control unit (22). The two vehicles (10, 20) are coupled together by at least one connection (26) and form a combination (21). At least the second vehicle (20) comprises an electric drive (30) or an e-axle module (56) as well as a second control unit (28). According to the method, a), the selection of a recuperation strategy (74) for recovering electrical energy in the second vehicle (20) is carried out such that electrical loads integrated into the low-voltage onboard electrical system (40) are supplied and a battery (42) is not discharged or charged; b) the first vehicle (10) is supported in acceleration or deceleration phases by correspondingly actuating the electric drive (30) or the e-axle module (56) of the second vehicle (20); and c) the deceleration according to step b) is maximized by the second vehicle (20) while taking into consideration the limits of the (Continued)

drive stability of the combination (21) formed from the first vehicle (10) and the second vehicle (20).

15 Claims, 3 Drawing Sheets

(51) Int. Cl.

| | |
|---|---|
| ***B60L 53/53*** | (2019.01) |
| ***B60L 53/62*** | (2019.01) |
| ***B60L 53/66*** | (2019.01) |

(52) U.S. Cl.

CPC ............... *B60L 53/62* (2019.02); *B60L 53/66* (2019.02); *B60L 2210/10* (2013.01)

(56) References Cited

U.S. PATENT DOCUMENTS

| | | | | |
|---|---|---|---|---|
| 2019/0299807 | A1 | 10/2019 | Oyama et al. | |
| 2021/0031770 | A1 | 2/2021 | Knorr | |
| 2021/0188279 | A1* | 6/2021 | Glavinic | B60W 10/184 |
| 2023/0347855 | A1* | 11/2023 | Plow | B60T 8/342 |

FOREIGN PATENT DOCUMENTS

| | | | |
|---|---|---|---|
| DE | 102016212071 | A1 | 1/2018 |
| DE | 102016214171 | A1 | 2/2018 |
| DE | 102019205480 | A1 | 10/2020 |
| DE | 102019208880 | A1 | 12/2020 |
| DE | 102019217726 | A1 | 5/2021 |
| DE | 202021003134 | U1 | 11/2021 |
| EP | 2039577 | B1 | 12/2010 |

* cited by examiner

Fig. 3.1

METHOD FOR TRANSPORTING A SECOND VEHICLE BY MEANS OF A FIRST VEHICLE

BACKGROUND

The invention relates to a method for transporting a second vehicle by means of a first vehicle with a first control unit, wherein the vehicles are coupled together by at least one connection and form a combination and at least the second vehicle comprises an electric drive or an e-axle module, as well as a second control unit. Furthermore, the invention relates to the use of the method for transporting a second vehicle by means of a first vehicle.

DE 101 57 976 A1 relates to a control system for a combination vehicle, which comprises a traction machine and a vehicle trailer. The control system comprises a computer, a memory that the computer can access, sensors that are operatively connected to the computer, output signals from the computer, and at least two brake control units for wheels of the vehicle trailer, wherein the brake control units are in communication with the computer and the computer receives input signals from the sensors of the combination vehicle and calculates braking movements, to control the movement of the combination vehicle.

EP 2 039 577 B2 discloses a combination of a towing device, an electric vehicle, and a towing vehicle for towing the electric vehicle. The electric vehicle comprises a high-voltage line for supplying power from a storage device via an inverter to a drive motor, a storage device control unit for controlling the storage device, a vehicle control unit for controlling the drive motor and the high-voltage line, a low-voltage line for supplying voltage to the inverter, the storage device control unit and to the vehicle control unit and a communication network for transmitting signals between the vehicle control unit, the inverter and the storage device control unit. The towing device includes a connecting tool mounted between the electric vehicle and the towing vehicle and transmitting a towing force of the towing vehicle to the electric vehicle, and a communication cable releasably connected to a connection terminal connected to the communication network and connecting a drive motor prioritization control unit arranged in the towing vehicle to the vehicle control unit. The towing device also includes a power supply cable releasably connected to a power supply terminal connected to the low-voltage line and connecting a power/voltage source arranged in the towing vehicle to the low-voltage line.

One particular application encountered in the United States when transporting or towing vehicles is to carry a vehicle, for example, behind a mobile home. The towed vehicle is carried over long periods of time and for long distances. It is therefore not a question of towing an accident-damaged vehicle or a vehicle to be removed from a no-parking zone, but of the targeted transport of an intact vehicle. The towed vehicle either stands with its drive axle on a dolly tow or rolls with all four wheels directly on the road. For vehicles with an internal combustion engine, the vehicle must be shifted into neutral, i.e., the engine and drive axle must be decoupled. In addition, the braking system of the towed vehicle is still mechanically, pneumatically, or electrically connected to the towing vehicle to allow it to mechanically brake. Finally, a 12-volt onboard electrical system, i.e., a low-voltage electrical system of the towed vehicle, is connected to the towing vehicle in some variants to prevent it from discharging during long journeys.

Today's electrically driven vehicles typically do not have a shiftable gearbox or disconnect clutch on their main drive axle and cannot be easily towed over long distances due to the electric motors with permanent magnets that are generally installed. In this case, the electric motor would permanently generate current or voltage without active control, which would lead to electrical or thermal destruction of the entire electric drive after a short travel period.

SUMMARY

According to the present invention, a method for transporting a second vehicle by means of a first vehicle with a first control unit is proposed, wherein the vehicles are coupled together by at least one connection and form a combination, and at least the second vehicle comprises an electric drive or an e-axle module and a second control unit, and wherein the following method steps are to be passed through:

a) selecting a recuperation strategy for recovering electrical energy in the second vehicle such that electric loads are supplied in its low-voltage onboard electrical system and a battery is not discharged or charged;

b) supporting the first vehicle in acceleration or deceleration phases by correspondingly actuating the electric drive or the e-axle module of the second vehicle, and c) maximizing a deceleration according to step b) by the second vehicle while taking into consideration the limits of the drive stability of the combination formed by the first vehicle and the second vehicle.

The proposed method according to the present invention allows for the transport of an electric vehicle over long distances in the towing mode on four rolling wheels without a separate transport base being required and without the electric vehicle being able to suffer damage for the reasons set forth above. In addition, it ensures that discharging a 12-volt battery in the low-voltage circuit, for example, is avoided, that all functions are permanently retained, and that no additional energy supply is required from the towing vehicle, i.e. the first vehicle.

In a further embodiment of the proposed method according to the invention, a) a charging state of the battery as well as a consumption in the low-voltage onboard electrical system is detected continuously or at certain points in time and an inverter of the electric drive is controlled accordingly. The recuperating power of the electric drive can thus be adjusted to the consumption set in the low-voltage onboard electrical system or to the charging state of the battery present in the low-voltage onboard electrical system.

In an advantageous embodiment of the method proposed according to the invention, an increase in the power of a DC/DC converter arranged between a high-voltage onboard electrical system and the low-voltage onboard electrical system of the second vehicle is requested according to step a) when the battery is discharged, which is obtained from the rolling movement of the second vehicle in accordance with the recuperation strategy.

In the method proposed according to the present invention, the first and second vehicles are connected to each other via a wireless communication link between the first control unit and the second control unit. This means that data and information can be exchanged between the two vehicles forming the combination while travelling.

In an advantageous further development of the method proposed according to the invention, in the event that both vehicles are equipped with an e-axle module as well as traction batteries, a decision is made according to a height profile of a travel path as to which recuperation strategy is used for a recovery of electrical energy and its feed into the traction batteries.

The method proposed according to the invention allows the selection of a recuperation strategy in accordance with a charging state of the respective traction batteries desired at the destination of the travel path.

According to the method proposed according to the present invention, the traction batteries recuperate in equal proportions according to a first recuperation strategy (A) and each have first and second increased charging states at the destination.

Alternatively, in the method proposed according to the present invention according to a second recuperation strategy (B), it can be achieved that only the first vehicle recuperates electrical energy and its traction battery assumes an “almost fully charged” charging state when the destination if reached.

Finally, in the method proposed according to the invention, it is possible, in accordance with a third recuperation strategy (C) to be applied, for only the second vehicle to recuperate electrical energy and for its traction battery to assume an “almost fully charged” charging state.

In the method proposed according to the invention, according to step c), the limits of the drive stability of the combination are taken into consideration on the basis of one or more criteria listed below:

- crosswind acting on the combination,
- slope or decline of the travel path,
- frictional value of the road surface,
- steering movement of the first vehicle,
- lateral slope of the vehicles,
- relative movement of the two vehicles to each other,
- detection of vibrations/swinging.

In an advantageous embodiment of the method proposed according to the invention, in the event that the first vehicle is powered by an internal combustion engine, a recuperation of electrical energy is carried out via the second vehicle, which alone decelerates the combination. Thus, by the method proposed according to the present invention, a deceleration of a conventional vehicle can also be achieved by an electrically driven vehicle integrated in a combination.

In advantageous further development of the method proposed according to the invention, the first vehicle and the second vehicle or their control devices are coupled together via a wireless communication link, via which information regarding the time and the strength of the recuperation is transmitted to the second vehicle.

In the method proposed according to the invention, controlled emergency braking of the second vehicle may be initiated in an advantageous manner upon interrupting the connection between the first and second vehicles. If this is equipped with at least one driving assistance system, its controlled navigation to the roadway edge can be carried out to avoid endangering the remaining road users. This represents a further safety gain achievable by the method proposed according to the invention.

In the method proposed according to the invention, the traction battery of the second vehicle can be recharged with adjustable power, wherein the recuperation power can be adjusted depending on a length of the planned travel path, its slope profile and a maximum allowable load for the first vehicle.

Finally, the invention relates to the use of the method for transporting a second vehicle by means of a first vehicle, wherein at least one of the vehicles comprises a traction battery and an electric drive or an e-axle module.

The solution proposed according to the invention makes it possible to move an electric vehicle behind a first towing vehicle over long distances with four rolling wheels, i.e. without having to use a trailer or the like, in tow mode. Electrical or thermal overload may be avoided by the application of the method proposed according to the invention. A battery arranged in the second vehicle, in this case the electric vehicle, in its low-voltage circuit does not discharge, but is supplied by recuperative operation of the electric drive unit in a correspondingly adjustable manner, so that all functions are permanently maintained and no additional energy supply from the towing vehicle, i.e. the first vehicle, is required.

Furthermore, the method proposed according to the invention can ensure that no additional load is placed on the first vehicle, i.e. the towing vehicle, resulting in lower fuel consumption and less wear on its brakes. Furthermore, the drivability of such a combination can be significantly improved, as the additional weight in the form of the towed vehicle is not noticeable or only insignificantly noticeable.

By using the method proposed according to the invention, freely controllable braking of the second vehicle in the event of an unintended decoupling can further be achieved. In addition, the method proposed according to the invention offers the possibility, for example, to condition the second vehicle, i.e. the towed vehicle, so that it is fully loaded at the destination and can, for example, drive directly into any environmental zone that may be present there, i.e. is immediately ready for use.

Considering the criteria for increasing the travel stability or avoiding a swinging of the vehicle between the tow vehicle and the tow vehicle may result in a significant improvement in the travel stability of a track as part of dynamic control. Furthermore, its energy efficiency may be increased if the towing vehicle is unable to recuperate, for example if it is a conventional vehicle with an internal combustion engine. In this case, any deceleration generated electrically is performed in the towed, electrically powered vehicle.

BRIEF DESCRIPTION OF THE DRAWINGS

Embodiments of the invention are described in greater detail hereinafter with reference to the drawings and the subsequent description.

Shown are.

DETAILED DESCRIPTION

In the following description of the embodiments of the invention, identical or similar elements are denoted by identical reference signs, whereby a repeated description of these elements is omitted in individual cases. The drawings show the subject matter of the invention only schematically.

Figure 1:
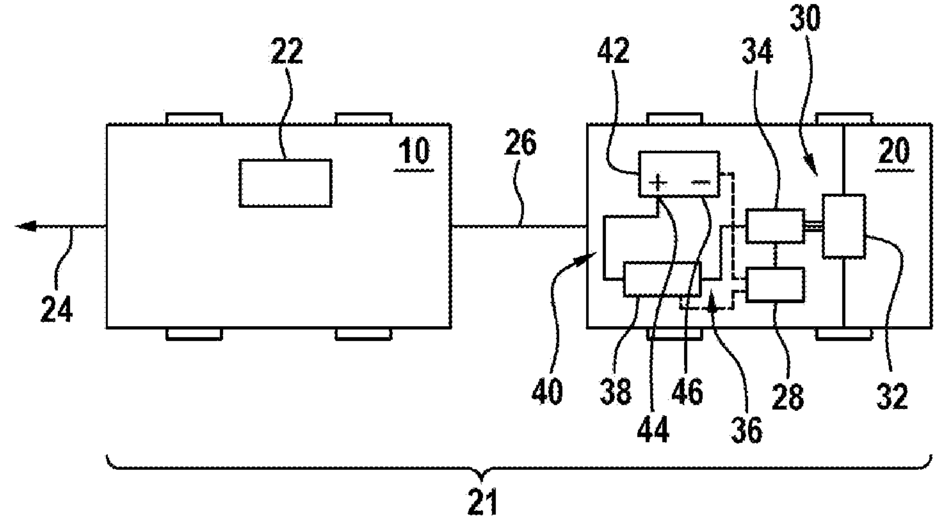
FIG. 1 a combination of a first towing vehicle and a second towing vehicle, which is an electrically driven vehicle, wherein the two vehicles are coupled together via a connection, FIG. 2 a combination of two vehicles, which are electric vehicles and are mechanically coupled together via the connection, FIGS. 3 and 3.1 a height or travel path profile and charging states corresponding to selected recuperation strategies on the traction batteries of two vehicles coupled together according to FIG. 2, preferably electrically driven vehicles, and FIG. 4 a combination of a first vehicle having an internal combustion engine and a second vehicle coupled thereto, which is an electric vehicle.

FIG. 1 shows a schematic diagram of a combination 21 comprising a first vehicle 10, which is the towing vehicle, and a second vehicle 20, which is the towed vehicle. The two vehicles 10, 20 form the aforementioned combination 21 and are coupled together via, for example, a connection 26, which can be configured as a mechanical connection. The first vehicle 10 includes a first vehicle control unit (VCU) 22. The combination 21 is moved in a direction of travel 24, which is predetermined by the first vehicle 10. The second vehicle 20, which is coupled to the first vehicle 10 via connection 26, has a second vehicle control unit (VCU) 28. Furthermore, the illustration according to FIG. 1 shows that the second vehicle 20 comprises an electric drive 30 comprising an electric machine 32 and an inverter 34. In addition, there is also a high-volt battery (not shown) in the second vehicle 20, which is part of a high-voltage onboard electrical system 36 in which the electric machine 32 and the inverter 34 are integrated. Moreover, the second vehicle 20 includes a DC/DC converter 38 that separates said high-voltage onboard electrical system 36 from a further one, namely a low-voltage onboard electrical system 40, which typically operates at a voltage level of 12 volts. At least one battery 42 is present in the low-voltage onboard electrical system 40 and operates at a voltage level of 12 volts, while the high-voltage onboard electrical system 36 of the second vehicle 20 has a voltage of approximately 400 volts. A positive pole of the battery 42 is denoted by reference numeral 44, while the negative pole is denoted by reference numeral 46.

If the combination 21 is moved in the direction of travel 24 by the first vehicle 10 according to the illustration in FIG. 1, the second vehicle 20 with its four wheels remains on the roadway so that motion energy can be converted into electrical energy via the electric drive 30. This recuperative electrical energy generated by recuperative means can be fed into the battery 42 of the low-voltage onboard electrical system 40 and supply other loads integrated in the low-voltage onboard electrical system 40 with electrical energy. Accordingly, a separate supply of the second vehicle 20 by the first vehicle 10 via the connection 26, for example, is not required, because the second vehicle 20 is substantially autonomous in terms of its energy supply. The second control unit 28 of the second vehicle 20 may control the amount of energy to be recuperated such that the demand of the low-voltage onboard electrical system 40 is met and also the battery 42 provided in the system (12 Volts) achieves a desired charging state, typically fully charged. To this end, the charging state of the battery 42 as well as the on-board power consumption, i.e. the consumption in the low-voltage onboard electrical system 40, is continuously detected and the inverter 34 of the electric drive 30 is controlled accordingly.

Figure 2:
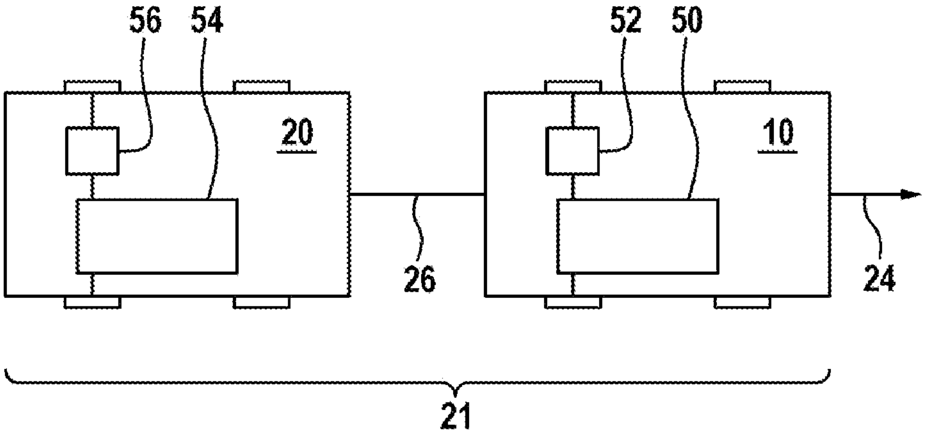

The illustration according to FIG. 2 shows a combination 21, in which the first vehicle 10 moving in the direction of travel 24 comprises a first traction battery 50 and an e-axle module 52. The first vehicle 10 is coupled to the second vehicle 20, which also represents an electrically driven vehicle, via said connection 26. The second vehicle 20 of the combination 21 includes a second traction battery 54 and an e-axle module 56.

In the above context, e-axle module 52, 56 is to be understood as a combination of multiple components, the components being an electric machine 32, an inverter 34, and possibly a single-stage or multi-stage gearbox.

The combination 21, comprising the first and second vehicles 10, 20, have traction batteries 50, 54 so that both vehicles 10, 20 are able to recuperate significant power outputs.

Figure 3:
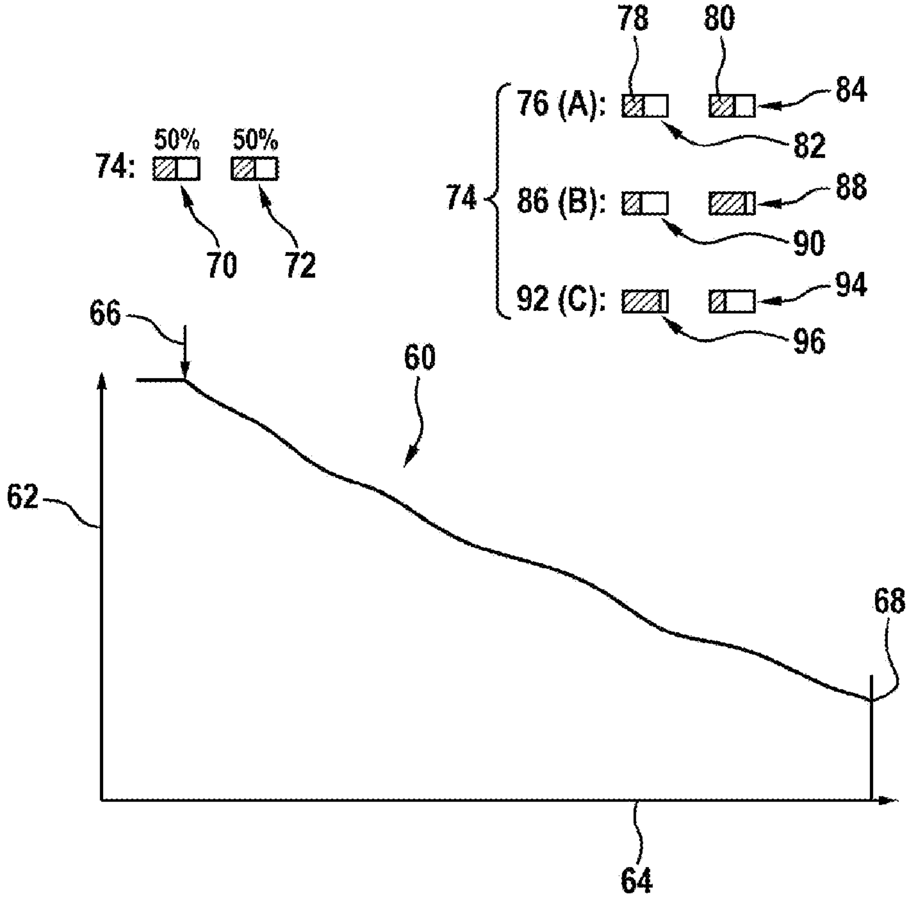

As can be seen from the illustrations according to FIGS. 3 and 3.1, various recuperation strategies 74 can be implemented using a downhill journey 60. During a longer downhill journey 60, as indicated schematically in FIG. 3, and which terminates at a destination 68, a decision can be made as to which recuperation strategy 74 should be used to divide the recuperation power of the two vehicles 10, 20 according to FIG. 2 in order to achieve a desired charging state at the end of the journey, i.e. when the destination 68 is reached. Based on FIGS. 3 and 3.1, various recuperation strategies 76 (A), 86 (B) and 92 (C) are explained below.

According to the illustration in FIG. 3, the starting point is a start 66 of the downhill journey 60, at which the traction batteries 50, 54 of the first vehicle 10 or the second vehicle 20, according to the illustration in FIG. 2, each have identical charging states 70, 72. For example, at the start of 66 the downhill journey 60, these may each be 50%. When a first recuperation strategy 76 (A) is implemented, recuperation takes place in both vehicles 10, 20 in equal proportions during the downhill journey 60 until the destination 68 is reached, so that the respective traction batteries 50, 54 of both vehicles 10, 20 are each charged by an identical proportion 78, 80 when the destination 68 of the downhill journey 60 is reached and an increased charging state 82, 84 is set in both traction batteries 50, 54 in accordance with the first recuperation strategy 76. The respective portions 78, 80 obtained by the first recuperation strategy 76 are identical as can be seen in the comparison from FIG. 3.1.

Conversely, if a second recuperation strategy 86 (B) is selected during the downhill journey 60, then the first vehicle 10 will recuperate a higher power, whereas the second vehicle 20 will not recuperate, as shown in FIG. 2. As a result, the first traction battery 50 of the first vehicle 10 is significantly more charged at the end of the journey, i.e., when the destination 68 is reached, whereas the second traction battery 54 of the second vehicle 20 has an identical charging state compared to the start of the journey or is somewhat more depleted due to the possible self-consumption of the second vehicle 20. For example, the second recuperation strategy 86 (B) is selected if the second vehicle 20 either has a defect or is not intended to continue on its own at the end of the journey, but instead has to go to a workshop.

Finally, according to the illustration in FIG. 3, a further, third recuperation strategy 92 (C) is also possible, according to which, for example, the second, towed vehicle 20 recuperates during the downhill journey 60, whereas the towing, first vehicle 10 does not recuperate. In this case, at the destination 68 of the downhill journey 60, the first traction battery 50 of the first vehicle 10 is empty, i.e. has a lower charging state compared to that at the start of the downhill journey 60, whereas the second traction battery 54 of the second vehicle 20 has an “almost fully charged” charging state 96. Consequently, in this case the second vehicle 20 could be moved on immediately when reaching the destination 68, for example enter a low emission zone with an almost fully charged second traction battery 54 and continue to be used there.

Figure 4:
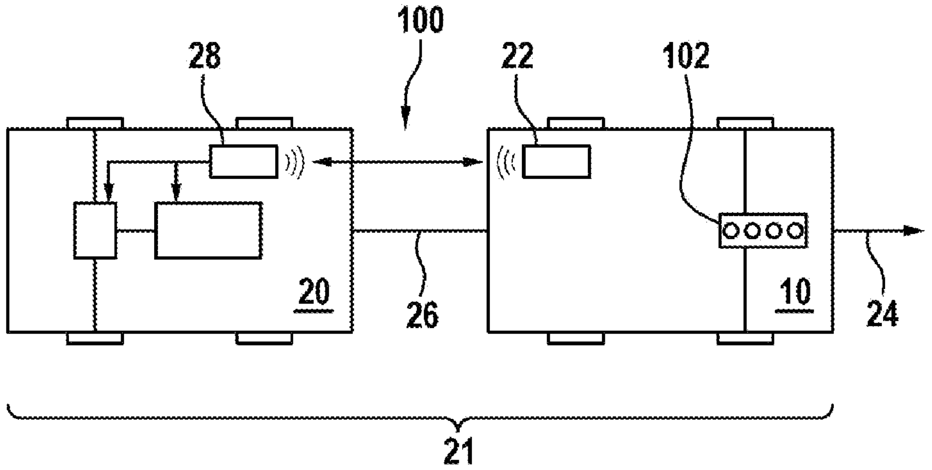

The illustration according to FIG. 4 shows a combination 21 in which the first vehicle 10 is powered by an internal combustion engine 102, whereas the second, towed vehicle 20 is an electrically driven vehicle that includes an e-axle module 52 and a traction battery 50. The two vehicles 10, 20 of the combination 21 shown in FIG. 4 are connected to each other via the connection 26. Moreover, a wireless communication link 100 between the two vehicles 10, 20 ensures that information or data transfer between the two control units 22, 28 of the two coupled vehicles 10, 20 forming the combination 21 can be ensured.

By its very nature, the first vehicle 10 of the combination 21 of FIG. 4 has no recuperation capability because its drive is via the internal combustion engine 102. In this case, the recuperation occurs exclusively via the second vehicle 20. The second vehicle 20 not only proportionally supports the braking operation, but is in particular solely responsible for the deceleration of the combination 21 according to the characteristic in FIG. 4. By this, a higher energy efficiency can be achieved as the towing vehicle, i.e. the first vehicle 10, does not recuperate. The two control units 22, 28 coupled together via the wireless communication link 100 communicate with each other, so that the second vehicle 20 receives the information as to when and at what height the recuperation is to begin.

The deceleration applied by the towed vehicle, i.e. the second vehicle 20, is maximized in this vehicle, taking into account possible limits to the drive stability of the combination 21. For example, the recuperation which causes the deceleration of the second vehicle 20 depends, for example, on the crosswind acting on the combination 21, on strong steering movements of the first vehicle 10 or also on the nature or the coefficient of friction of the road surface on which the combination 21 is travelling. Furthermore, the deceleration, which can be set at maximum by the second vehicle 20, is limited by strong positive or negative slopes, as well as a maximum load or pulling force to be applied by the first vehicle 10, which moves the combination 21.

By activating the second vehicle 20, which is typically the electrically driven vehicle within the combination 21, its electric drive 30 can be controlled such that electrical or thermal overload does not occur during the transport operation. Just enough electrical energy is recuperated so that the 12-volt loads in the low-voltage onboard electrical system 40 of the second vehicle 20 can be permanently supplied and the battery 42 does not discharge or can even be recharged. The control of the electric drive 30 is set in such a way that it supports the first vehicle 10 during acceleration or braking and therefore behaves in such a way that no extra loads occur for the first vehicle 10 during deceleration or acceleration. The solution proposed according to the present invention can also ensure that the electric drive 30 of the second vehicle 20 comes to a standstill if the connection 26 between the first vehicle 10 and the second vehicle 20 is interrupted. The second traction battery 54 of the second vehicle 20 can be fully charged by continuous recuperation using a corresponding control system. The cooling system is controlled to dissipate any heat losses occurring in the inverter 34 and the electric machine 32 to prevent heating.

The low-voltage onboard electrical system 40 with the battery 42 (12 volt) shown in FIG. 1 is monitored by means of a battery sensor, so that the current flow out of or into the battery 42 is known. Discharging of the battery 42 via a communication link 100, such as via a CAN bus, requests an increase in the power of the DC/DC converter 38 located between the high-voltage onboard electrical system 36 and the low-voltage onboard electrical system 40 of the second vehicle 20. The power is not drawn from the high-voltage battery, but is directly recovered from the rolling motion of the second vehicle 20 by appropriate recuperation.

With the method proposed according to the present invention, it can be achieved that the electric drive 30 or the e-axle module 56 of the towed second vehicle 20 is controlled such that it supports acceleration or braking operations of the first vehicle 10. The second vehicle 20 is connected to the first towing vehicle 10 via a wireless communication link 100 so that the second vehicle 20 can determine whether the first vehicle 10 is just accelerating or decelerating. The communication link 100 may be used to communicate the current operating point of electric drive 30. Alternatively, it is possible to use a mechanical transmission on the clutch, similar to an overrun brake, to detect a tension or force sensor or a potentiometer on the clutch of the first vehicle 10 and convert it into an electrical control signal for the second vehicle 20. The same logic applies in reverse for the deceleration. When the second vehicle 20 runs on the coupling, the path of the moving element or a force is detected and converted into an electrical signal. The second vehicle 20 uses the received signal to support and also accelerate or brake the first vehicle 10, thereby automatically reducing the control signal again.

In an advantageous manner, the method proposed according to the invention can be used to control the electric drive 30 of the second vehicle 20 in such a way that it recuperates strongly during the entire journey 64 and thus charges a high-voltage battery accordingly in accordance with an adjustable power consumption. Setting parameters for the electrical power consumed can be the length of the planned travel path 64, the gradient, i.e. the height profile 62, and a maximum load for the first vehicle 10 in order to achieve an optimum load in each case.

The invention is not limited to the exemplary embodiments described herein and the aspects highlighted thereby. Rather, within the range specified by the claims, a plurality of modifications is possible, which lie within the abilities of a skilled person.

The invention claimed is:

1. A method for transporting a second vehicle (20) by means of a first vehicle (10) with a first control unit (22), wherein the vehicles (10, 20) are coupled together by at least one connection (26) and form a combination (21), and at least the second vehicle (20) comprises an electric drive (30) or an e-axle module (56) and a second control unit (28), the method comprising the following steps:

a) selecting a recuperation strategy (74) for electrical energy in the second vehicle (20) such that electric loads integrated in a low-voltage onboard electrical system (40) are supplied and a battery (42) is not discharged or charged;

b) supporting the first vehicle (10) in acceleration or deceleration phases by correspondingly actuating the electric drive (30) or the e-axle module (56) of the second vehicle (20), and c) maximizing a deceleration according to step b) by the second vehicle (20) taking into consideration limits of drive stability of the combination (21) formed by the first vehicle (10) and the second vehicle (20).

2. The method according to claim 1, wherein, according to step a), a charging state of the battery (42) as well as a consumption in a low-voltage onboard electrical system (40) is detected and an inverter (34) of the electric drive (30) is controlled accordingly.

3. The method according to claim 1, wherein, according to step a), when the battery (42) is discharged, an increase in a power of a DC/DC converter (38) arranged between a high-voltage onboard electrical system (36) and the low-voltage onboard electrical system (40) of the second vehicle (20) is requested, which is obtained from rolling movement of the second vehicle (20) according to the recuperation strategy (74).

4. The method according to claim 1, wherein the first vehicle (10) and the second vehicle (20) are connected and exchange information via a wireless communication link (100) between the first control unit (22) and the second control unit (28).

5. The method according to claim 1, wherein, when both vehicles (10, 20) are equipped with e-axle modules (52, 56) as well as traction batteries (50, 54), a decision is made according to a height profile (62) of a travel path (64) as to which recuperation strategy (74) is used for recovery of electrical energy and its supply into the traction batteries (50, 54).

6. The method according to claim 5, wherein the recuperation strategy (74) is selected according to a desired charging state (82, 84; 88, 90; 94, 96) of the traction batteries (50, 54) at a destination (68) of the travel path (64).

7. The method according to claim 5, wherein, according to a first recuperation strategy (76) (A), the traction batteries (50, 54) recuperate in equal proportions (78, 80) and have first and second increased charging states (82, 84) at the destination (68).

8. The method according to claim 5, wherein, according to a second recuperation strategy (86) (B), only the first vehicle (10) recuperates electrical energy and its traction battery (50) has an "almost fully charged" charging state (88).

9. The method according to claim 5, wherein, according to a third recuperation strategy (92) (C), only the second vehicle (20) recuperates electrical energy and its traction battery (54) has an "almost fully charged" charging state (96).

10. The method according to claim 1, wherein, according to step c), the limits of the drive stability of the combination (21) are taken into consideration based on at least one selected from the group consisting of:

crosswind acting on the combination (21), slope or decline of a travel path (64), frictional value of a road surface, steering movements of the first vehicle (10), lateral slope of the vehicles (10, 20), relative movement of the two vehicles (10, 20) to each other, and detection of vibrations/swinging.

11. The method according to claim 1, wherein, when the first vehicle (10) is powered by an internal combustion engine (102), a recuperation of electrical energy occurs via the second vehicle (20) and this alone performs the deceleration of the combination (21).

12. The method according to claim 11, wherein the first vehicle (10) and the second vehicle (20) and/or their control devices (22, 28) are coupled together via a wireless communication link (100), via which information regarding a time and a strength of the recuperation is transmitted to the second vehicle (20).

13. The method according to claim 1, wherein, when the connection (26) between the first vehicle (10) and the second vehicle (20) is interrupted, controlled emergency braking of the second vehicle (20) is initiated or, in a second vehicle (20) equipped with at least one driving assistance system, controlled navigation is carried out on a roadway edge.

14. The method according to claim 1, wherein a traction battery (54) of the second vehicle (20) is recharged with adjustable power, wherein a recuperation power is adjusted depending on a length of a planned travel path (64), its slope curve (62) and a maximum allowable load for the first vehicle (10).

15. A use of the method according to claim 1 for transporting a second vehicle (20) by means of a first vehicle (10), wherein at least one of the vehicles (10, 20) comprises a traction battery (50, 54) and an electric drive (30) or an e-axle module (52, 56).

* * * * *